March 25, 1941.                R. C. RUSSELL                2,236,415
                          SERVO BRAKE MECHANISM
                    Filed April 26, 1935        4 Sheets-Sheet 2

INVENTOR.
Robert C. Russell.
BY
Harness, Dickey, Pierce & Hann.
ATTORNEYS.

Patented Mar. 25, 1941

2,236,415

UNITED STATES PATENT OFFICE 2,236,415

SERVO BRAKE MECHANISM

Robert C. Russell, Cleveland, Ohio, assignor to Eaton Manufacturing Company, Cleveland, Ohio, a corporation of Ohio Application April 26, 1935, Serial No. 18,355

14 Claims. (Cl. 188—140)

This invention relates to brake mechanism and particularly to that type thereof applicable for use in connection with automobiles, the principal object being the provision of a braking mechanism of novel construction by means of which accurate control of the brake forces may be obtained, that permits application of the brakes by a minimum amount of effort on the part of the operator, and that is efficient in operation.

Objects of the invention include the provision of a manually controlled hydraulic column for controlling a brake mechanism; the provision of a brake control device including a pair of cylinders connected by a tube, a piston in each of the cylinders, a mass of liquid filling the tube and cylinders between the pistons, and means for automatically compensating for variations in the volume of liquid in the device, one of the pistons being connected to a foot operated pedal and the other of the pistons being connected to a brake mechanism to be operated thereby; and the provision of a brake control device capable of connecting a manually operated pedal with a brake mechanism regardless of the distance or relation between the parts.

Other objects of the invention including the provision of a servo brake mechanism of novel construction; the provision of a manually controlled servo brake mechanism of simple and compact design; the provision of a servo brake mechanism including a driven member provided with a peripheral cam surface, and a radially disposed plunger carrying a roller in contact with the same so as to be reciprocated thereby, the plunger being connected to the master cylinder of a hydraulic brake system whereby to control the actuation thereof; and the provision of a servo brake mechanism including a driven member having a peripheral cam surface and a radially disposed plunger adapted to be actuated thereby, the plunger being guided in a boss and the boss being slotted for passage of the cam member therethrough, and the cam member being provided with stop surfaces engageable with the boss to limit excessive movement of the cam member.

Other objects of the invention include the provision of means in a servo brake mechanism for sensibly advising the operator of the degree of braking force being applied to the automobile in which it is incorporated; the provision of means in a servo brake mechanism for effecting a reaction in the manually operated brake control member in opposition to the brake applying force applied thereto by the operator, in a degree proportional to the amount of braking force being applied by the servo mechanism to the automobile of which it forms a part; the provision of a braking mechanism for an automobile including a mechanically actuated servo mechanism and a hydraulic braking system for the automobile actuated thereby, together with means interacting between the hydraulic braking system and the manually operated control member for the servo mechanism to oppose braking movement of the control member by a force proportional to the pressure exerted in the hydraulic braking system; the provision of an automobile braking mechanism including a mechanical servo mechanism and a hydraulic braking system operated thereby, the control member for the servo mechanism being connected to a cylinder and the cylinder, in turn, being in communication with the hydraulic braking system whereby application of the brakes of the automobile through actuation of the servo mechanism will be opposed by the pressure in the hydraulic braking system as applied to the control member through the cylinder; the provision of a braking system for an automobile including a mechanically operated servo mechanism, a hydraulic braking system operated by said servo mechanism and a hydraulic control for the servo mechanism, the hydraulic braking system and the hydraulic control being inter-communicated and so constructed and arranged that the force applied to the hydraulic control to cause operation of the servo mechanism and consequent application of the hydraulic braking system to the vehicle is opposed by a force proportional to the brake applying force of the hydraulic braking system.

Other objects of the invention include the combination of a mechanical servo mechanism and a hydraulic braking system operated thereby, together with means for dampening the action of the servo mechanism on the hydraulic braking system; the provision of means for preventing locking of the driving and driven friction elements of a mechanical servo mechanism when the mechanism is operated at low rotational speeds; the provision of means for preventing locking of the driving and driven friction elements of a mechanical servo mechanism at low rotation speeds including a hydraulic master cylinder actuated by the driven member of the servo mechanism and provided with means for limiting the flow of liquid from the master cylinder; the provision of an automobile braking system including a mechanical type servo mechanism and a hydraulic braking system, the braking system including a master cylinder connected to the various wheel brakes and adapted to be operated by the servo mechanism, the master cylinder being provided with a metering orifice adjacent its discharge end whereby to limit the rate of flow of liquid from the master cylinder to the wheel brakes; the provision of means as just described including a manually operated member for controlling the actuation of the servo mechanism, a cylinder or equivalent operatively connected to the control member, and means connecting the cylinder with the hydraulic braking system at a point between the orifice and the wheel brakes, whereby to oppose the actuation of the servo mechanism by a force at all times proportional to the application force on the wheel brakes; and the provision of a construction as above described including a metering orifice in which the orifice is formed in a valve member normally urged toward seated position by resilient means whereby plugging of the orifice will not result in failure of the braking system.

The above being among the objects of the present invention, the same consists in certain novel features of construction, combination of parts, and methods of operation as will hereinafter be described with reference to the accompanying drawings, and then claimed, having the above and other objects in view.

In the accompanying drawings which illustrate suitable embodiments of the present invention and in which like numerals refer to like parts throughout the several different views.

Fig. 16 is a view similar to Fig. 3 but showing a modification.

The present invention has been devised with the primary purpose in mind of obtaining as complete modulation as possible in a servo brake operating mechanism, and while the invention in its broader aspects is applicable to a variety of different uses where it is desired to operate one or more members with a minimum amount of manual exertion, it is particularly applicable to the braking systems of automobiles for which use it has been primarily designed and in which its advantages will perhaps be found to be capable of greater appreciation than in other installations. Accordingly, the description of the present invention herein will be confined to its application to a braking system for automobiles, this being by the way of an illustration of a preferred use of the invention, and its application to other uses will be apparent to those skilled in the art upon the disclosure herein given.

Servo brakes for automobile and other vehicles are generally old. Furthermore, in servo brakes as heretofore suggested attempts have been made to so construct them as to give the operator a feel of the brakes, that is, to sensibly advise him of the degree of braking action being applied to the vehicle by opposing the actuating force which he applies to the servo mechanism by a counter-force proportional to the force applied to the wheel brakes of the vehicle. One illustration of such previously suggested construction for the purpose will be found in my copending application for Letters Patent of the United States for Improvements in servo mechanism, filed March 26, 1934, and serially numbered 717,393 (Patent No. 2,090,335, August 17, 1937). This previous application discloses and claims a construction by which a feel of the brakes as well as modulation thereof may be obtained in a satisfactory manner and to a much finer degree than in constructions previously suggested, but I have found that it is possible to obtain a much finer degree of feel and modulation of the brakes if the servo mechanism is employed to actuate a hydraulic braking system instead of a mechanical braking system such as is disclosed in my previous patent application above identified. The reason for this is to some extent the fact that it is impossible to eliminate friction in a mechanical braking system and accordingly any friction existing in the system reacts through the servo mechanism to detract from the feel and fine degree of modulation which it is desired to obtain through the operating pedal. Hydraulic braking systems, having very little friction opposing moving parts of the braking mechanism, eliminates the undesirable characteristic of mechanical braking systems in this respect. At the same time I have found that where a hydraulic braking system is actuated by a servo mechanism it is possible to obtain a feel of the brakes in a very simple manner by opposing movement of the brake control member by a force proportional to that exerted on the wheel brakes by the hydraulic braking mechanism simply by opposing movement of the brake control pedal by means of a piston or equivalent element subjected to the same force as simultaneously exists in the hydraulic braking system. Accordingly, this is a feature of the present invention.

A further feature of the present invention resides in the elimination of the greater part of the friction found in constructions employing a mechanical connection between the brake control member of pedal and the servo mechanism and this is accomplished by employing a fluid or hydraulic column to connect the control pedal with the servo mechanism. This feature of the invention admirably lends itself to incorporation with it of the first feature above mentioned, namely the application of the fluid pressure in the hydraulic braking system to oppose movement of the control pedal, allowing the certain simplifications of design and economy in manufacture.

In a servo brake mechanism as heretofore suggested it has been found that if the vehicle of which the brake mechanism forms a part is travelling at a relatively low speed, for instance below ten miles per hour which may be considered as a normal low operating speed, and the brake pedal is suddenly and forcefully applied, the driving and driven members of the servo mechanism are pressed together almost instantaneously and rotate as a unit without slippage between them through a limited degree of rotation before the resistance built up to movement of the driven element causes slippage between the driving and driven elements. In such event the driving and driven elements in rotating together equally upon initiation of the braking action are caused to adhere to one another through static friction which, as is generally known, is greater than rubbing friction, and accordingly an excessive amount of resistance must be built up to rotation of the driven element before it is caused to slide or slip with respect to the driving element. The sudden release of the stresses set up in the various members of the brake mechanism required to break the driven member loose from the driving member under such circumstances results in an audible and very noticeable shock or thump in the servo mechanism which is objectionable to operators of vehicles having such mechanism incorporated as a part thereof, and accordingly it is a further object of the present invention to eliminate the possibility of such shocks or thumps caused by the reason stated to occur. It has been found that where a servo mechanism actuates a hydraulic braking system, if the flow of fluid from the master cylinder of the hydraulic braking system is restricted sufficiently, then under no circumstances, even though the vehicle is travelling at a relatively low rate of speed, may the servo driven member be caused to rotate equally with the driving member. This prevents the servo driving and driven members from rotating equally with each other so as to set up static friction between them and in this manner the undesirable feature above referred to may be completely eliminated.

Other inventive features included within the present invention will be brought out in the following description of the structures illustrated in the drawings.

Figure 1:
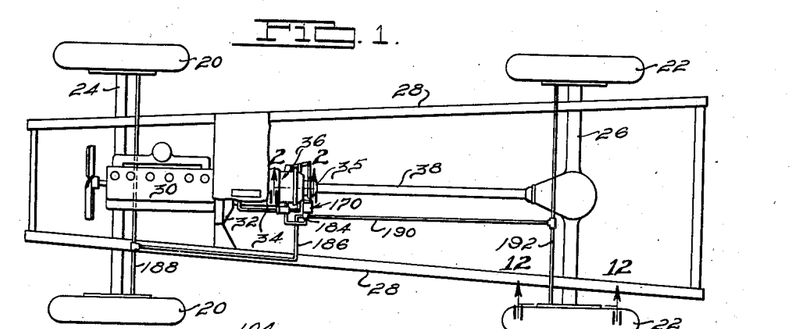
Fig. 1 is a more or less diagrammatic, partially broken, plan view of an automobile chassis illustrating the application of the present invention thereto.

Referring to the drawings, in Fig. 1 is illustrated an automobile chassis including front and rear wheels 20 and 22 respectively mounted upon front and rear axles 24 and 26 respectively, and supporting between them in a conventional manner a chassis frame including side rails 28. At the forward end of the chassis an internal combustion engine 30 forming the power plant for the vehicle is suitably supported between the side rails 28. A clutch housing 32 and transmission housing 34 are secured in order to the rear end of the engine 30. To the rear face of the transmission housing 34 is secured a servo mechanism indicated generally at 36. A propeller shaft 38 is connected at its forward end to the servo mechanism 36 through a universal joint 35 and at its rear end with the rear axle 26, and serves to transmit the power of the engine 30 to the rear axle 26 and consequently to the driving wheels 22.

Figures 2, 2A, 3, 4:
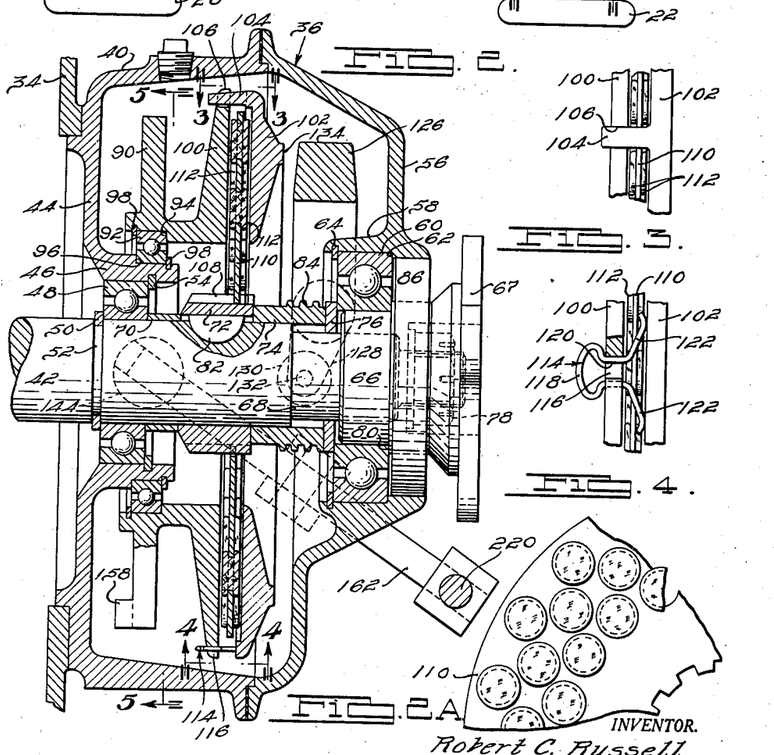
Fig. 2 is an enlarged vertical sectional view taken axially through the servo mechanism shown applied to the automobile chassis in Fig. 1 and as on the line 2—2 thereof.
Fig. 2a is a fragmentary face view of the driving disc for the servo unit.
Fig. 3 is an enlarged fragmentary view taken on the line 3—3 of Fig. 2 and illustrating the driving connection between the two driven members of the servo mechanism.
Fig. 4 is an enlarged fragmentary, partially broken view taken on the line 4—4 of Fig. 2 and illustrating one of the spring members provided for normally urging the two driven members of the servo mechanism out of clamping engagement with the driving member thereof.

Referring to Fig 2 it will be noted that the servo mechanism 36 includes a two part casing 40 through which the rear end of the main transmission shaft 42 projects. The casing 40 is provided with a forward wall 44 centrally provided with a rearwardly extending annular flange or sleeve 46 surrounding the shaft 42 in spaced and concentric relation with respect thereto and within which the shaft 42 is supported by means of the bearing assembly 48. A split ring 50 sprung into the groove 52 in the shaft 42 abuts against the forward face of the inner race of the bearing assembly 48 and a similar split ring 54 sprung into a cooperating annular groove on the inner face of the flange 46 abuts against the rear face of the outer race of the bearing assembly 48, and these split rings 50 and 54 cooperate with the bearing 48 to limit rearward movement of the shaft 42 in the housing 40.

The rear wall 56 of the casing 40 is also provided with a central annular flange portion or sleeve 58 within which a bearing assembly 60 is closely received. The outer race of the bearing assembly 60 abuts at its rear face against the shoulder 62 formed on the inner wall of the sleeve 58 and at its forward end against the split ring 64 sprung into a cooperating groove on the interior face of the sleeve 58. The rear end of the shaft 42 receives support within the bearing 60 by means of the hub portion 66 of a flange member 67 closely received upon the reduced end 68 of the shaft 42 and fitting within the inner race of the bearing 60. Between the bearing 48 and the bearing 60 the shaft successively receives a collar 70, hub 72, collar 74, and washer 76, these members being clamped in end to end relationship between the inner races of the bearings 48 and 60 by means of a nut 78 threaded upon the rear end of the transmission shaft 42 and which forces the shoulder 80 of the flange member 67 against the inner race of the bearing 60 and through it urges all of the members 70 to 76, inclusive, forwardly on the shaft 42. The hub 72, because of the torque which it must transmit as will hereinafter be more fully explained, is preferably additionally secured against rotation of the shaft 42 by means of a key 82. The collar 74 is provided with gear teeth 84 formed thereon for cooperation with a mating gear (not shown) of a speedometer drive mechanism in accordance with conventional practice. An oil seal member 86 of conventional construction is inserted in the rear end of the sleeve 58 to seal the casing 40 against escape of lubricant from the interior thereof rearwardly along the shaft 42. It may be noted that the flange member 67 is adapted to be secured to the universal joint 35, shown in Fig. 1, which serves to connect the shaft 42 to the propeller shaft 38.

Rotatably mounted within the casing 40 upon the forward annular flange or sleeve 46 is a cam member 90. A ball bearing assembly 92 is employed for rotatably supporting the cam member 90 upon the sleeve 46 and relative axial movement between the cam member 90 and flange 46 is prevented by means of cooperating shoulders 94 and 96 and spring rings 98 cooperating with the end faces of the outer and inner races of the bearing 92. Integrally secured to the cam member 90 in rearwardly spaced relation with respect thereto is an annular member 100 of disc-like formation having a plain rear face disposed in perpendicular relation with respect to the axis of the shaft 42. A similar annular member 102 is positioned in rearwardly spaced and concentric relation with respect to the member 100 and is provided with a plain forward face arranged in opposed relation to the rear face of the member 100. The member 102 is supported from the member 100 by means of three equally annularly spaced forwardly projecting lugs 104 arranged around the periphery thereof, each of the lugs 104 being received for sliding movement axially of the shaft 42 in a corresponding notch 106 formed in the periphery of the member 100, this connection permitting relative axial movement between the members 100 and 102 and maintaining them against relative rotation with respect to each other.

The outer surface of the hub member 72 is provided with axially directed splines 108. A driving disc 110 is received upon the hub 72 in interfitting relation with respect to the splines 108 so as to be rotatable directly therewith and with the shaft 42, but is axially slidable with respect to the shaft 42 and hub 72. The driving disc 110 extends outwardly between the members 100 and 102. Although, in the broader aspects of the invention, it makes no difference whether friction material is secured to the active faces of the driven members 100 and 102, or to opposite faces of the driving member 110, or what type of friction material is employed, such material is preferably formed from cork for the reason that the coefficient of friction of cork is not reduced, or in other words it does not fade out, to the same extent as most other friction materials when heated. This is of advantage in servo actuated brakes for the reason that in such installations there are two points at which this fading out may be apparent, one the servo device itself and the other the wheel brakes, and where fading out occurs at both points the result is accumulative and accentuates the undesirable effects thereof. Consequently, by employing cork for the frictional material in the servo mechanism to which use it is readily adapted, the accumulative fade out which would otherwise result at both the servo mechanism and the wheel brakes is largely eliminated and the fade out restricted to the latter alone.

Accordingly, the outer portion of the driving disc 110 is provided with friction facing on opposite sides thereof in the form of cork inserts 112. These are preferably of circular section as shown and are inserted by drilling or otherwise forming holes through the corresponding portions of the driving plate 110 and forcing the inserts thereinto so as to project substantially the same distance beyond opposite faces thereof. These holes are preferably so formed that the inserts 112 lie in closely adjacent relationship over the entire operative face of the driving disc 110 as indicated in Fig. 2a, but each insert is slightly spaced from its neighbor to permit ready displacement of oil from its active faces and for the purpose previously set out. It will be understood, of course, that the cork forms substantially the only friction facing with which the driving disc 110 is provided. The natural resiliency of these cork inserts 112 also imparts an unusual smoothness to the operation of the servo unit and eliminates any grabbing tendencies that might otherwise be apparent. The use of the cork inserts 110 forms no part of the present invention, but is included as part of the subject matter of the application of Edwin R. Evans for Letters Patent of the United States for Improvements in brake mechanism, filed January 13, 1936, Serial No. 58,861.

The driven disc members 100 and 102 are normally urged away from each other out of clamping relation with respect to the driving disc 110 by spring members 114 illustrated best in Fig. 4. As illustrated the periphery of the member 100 preferably midway between each notch 106 is provided with a notch 116 of dove-tail like formation when viewed axially of the member 100. The springs 114 each have a head portion 118, a restricted or neck portion 120 and oppositely bent angularly extending legs 122, the neck portion 120 being sprung into the corresponding notch 116 whose dove-tail like formation prevents radially outward movement thereof in the notch and the engagement of the head 118 and legs 122 at opposite edges of the notch 116 prevents displacement of the spring 114 axially of the member 110. The legs 122 project rearwardly beyond the rear face of the member 100 and bear against the forward face of the member 102 and thus resiliently urge the member 102 rearwardly so as to normally prevent the members 100 and 102 from frictionally engaging the driven disc 100 between them. Pressure applied to the member 102 to urge it forwardly may overcome the force of the spring legs 122 to permit the disc 110 to be frictionally engaged between the members 100 and 102 when desired.

Figures 7, 8:
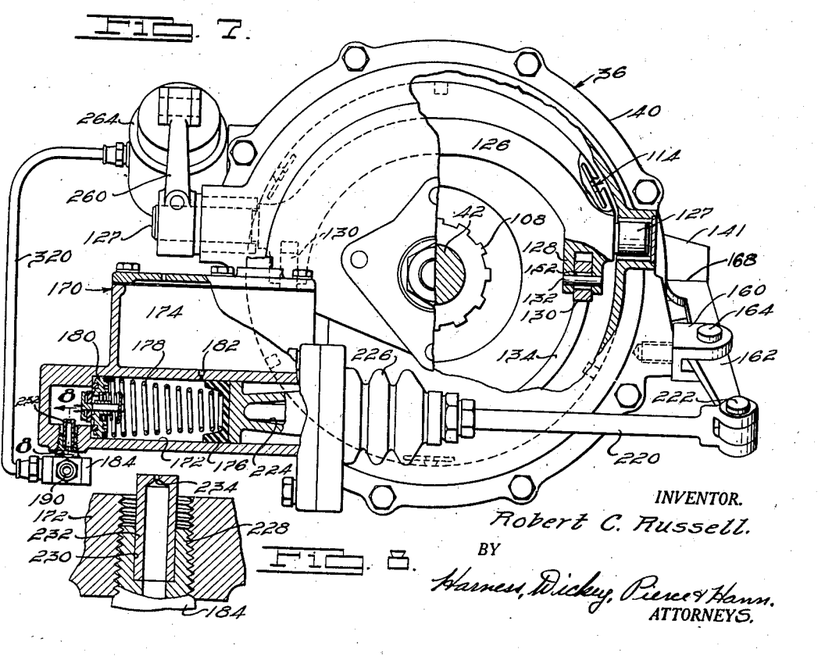
Fig. 7 is a slightly reduced, partially broken, partially sectioned view of the servo mechanism shown in Fig. 2 taken from the rear or right hand end thereof as illustrated in Fig. 2.
Fig. 8 is an enlarged, fragmentary sectional view taken on the line 8—8 of Fig. 7, centrally through the discharge orifice of the master cylinder.

Forward movement of the driven disc member 102 to effect frictional engagement of the driving disc 110 between it and the driven disc 100 is effected by means of a yoke member 126 journaled, as best illustrated in Fig. 7 at opposite sides of housing 40 about horizontally disposed shaft portions 127 vertically spaced with respect to the axis of the shaft 42. At opposite sides of the shaft 42 the yoke 126 is provided with a pair of downwardly directed arms 128 upon each of which is journaled a roller 130 by means of a pin 132, the axes of the rollers 130 lying approximately in a plane passing horizontally through the center of the shaft 42, and the peripheries of the rollers being presented for engagement with the rear face of the member 102, a track 134 being formed on the latter for accommodation of the rollers 130. As will be apparent, oscillation of the yoke 126 in a clockwise direction as viewed in Fig. 2 will cause the rollers 130 to press forwardly against the track 134, overcoming the force of the springs 114 and moving the member 102 forwardly to cause the driving disc member 110 to be frictionally engaged between these members 100 and 102 and thereby tend to cause the members 100 and 102 to rotate with the driving disc 110.

Figure 5:
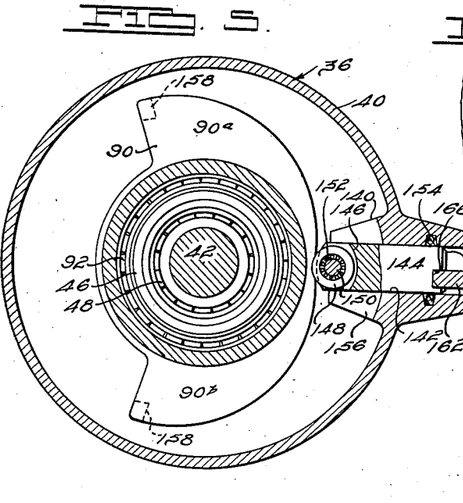
Fig. 5 is a slightly reduced transverse sectional view taken through the servo mechanism shown in Fig. 2 as on the line 5—5 thereof, the servo mechanism being illustrated in inoperative position.
Figure 6:
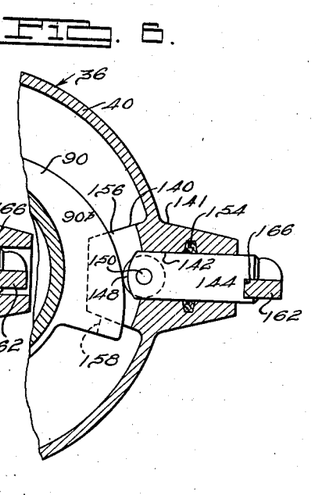
Fig. 6 is a fragmentary view taken in the same plane as in Fig. 5 but illustrating the servo mechanism in operative position and at the extremity of its movement in one direction.

Referring now to Figs. 5 and 6, it will be noted that the cam member 90 is provided with two connected cam lobes 90a and 90b each of approximately 120 degrees in angular extent and the peripheral surface of each of which extends along an approximately spiral path having a minimum radial dimension with respect to the axis of the shaft 42 at their point of juncture and having a maximum radial dimension at the outer or unconnected ends thereof. The housing 40 is provided at one side thereof with an inwardly projecting boss 140 in alignment, transversely of the shaft 42, with the cam member 90. A boss 141 is provided in alignment with the boss 140 on the exterior of the housing 40. The bosses 140 and 141 are provided with a common bore 142 arranged in radial relation with respect to the axis of the shaft 42, and relatively closely but axially slidably received in the bore 142 is a plunger 144. The inner end of the plunger 144 is slotted as at 146 to provide a yoke within which is received a roller 148 supported by means of a pin 150 extending through the yoked end of the plunger 144 in parallel relation with respect to the shaft 42. Anti-friction members 152, which may advantageously be of the needle bearing type, are preferably interposed between the pin 150 and roller 148 so as to permit unrestricted rotation of the roller 148 relative to the pin 150. An oil seal member 154 is preferably provided in the bore 142 for sealing it against the escape of lubricant around the plunger 144.

As illustrated in Figs. 5 and 6 the inner end of the boss 140 is preferably extended into close but spaced relation with respect to the cam member 90 when the latter is in its neutral or inoperative position illustrated in Fig. 5, and accordingly in order to permit the desired degree of rotation of the cam member 90 the inner end of the boss 140 is slotted as at 156 to provide for passage of the lobes 90a and 90b therethrough when the cam member 90 is rotated out of its neutral or inoperative position, as illustrated in Fig. 6 for instance. Advantage is taken of this construction to limit the maximum angular movement of the cam member 90 in either direction from its neutral position. This is accomplished by providing axially projecting stops or lugs 158 at the unconnected extremities of the lobes 90a and 90b, these lugs 158 being adapted to engage the corresponding side of the boss 140 upon maximum angular movement of the cam member 90 in either direction, as illustrated in Fig. 6, and thereby prevent rotation of the cam member 90 beyond the corresponding position.

As best illustrated in Fig. 7 a yoke-like bracket 160 is secured to the outer face of the housing 40 on the same side thereof as the boss 140 but in a position rearwardly and downwardly spaced from the latter. A two arm lever 162 is pivotally mounted in the bracket 160 by means of a pin 164, the forward end of the lever 162 being received in a slot 166 formed in the outer end of the plunger 144 for the purpose of receiving it. It will be noted that in order to obtain a maximum amount of bearing for the plunger 144 and yet maintain a minimum width of the device, the bosses 140 and 141 are of a combined length sufficient to receive the entire length of the plunger 144 therein, and the outer boss 141 is provided with an axially directed slot 168 through one side thereof to permit the corresponding end of the lever 162 to work therein and maintain its engagement with the plunger 144.

Inter-engagement of the lever 162 and the slot 166 maintains the plunger 144 and consequently the roller 148 in a desired position of rotation with respect to the axis of the plunger 144 to thereby maintain the proper rolling engagement between the roller 148 and the cam member 90. It will also be noted that the rear end of the lever 162 is located in vertically spaced relation below the rear end of the shaft 42 and as best brought out in Fig. 2 at a point slightly to the rear of the casing 40.

To the rear end of the casing 40 and at the side thereof opposite the boss 140 is secured a master cylinder assembly, indicated generally at 170, of a hydraulic braking system. This master cylinder assembly includes a cylinder proper 172 and a superimposed reservoir 174 adapted to hold a reserve supply of braking fluid in accordance with conventional practice. Except as hereinafter specifically pointed out this master cylinder assembly 170 is of generally conventional construction and includes a piston assembly 176 within the cylinder 172 constantly urged toward inoperative position by means of a coil spring 178 placed under compression between the piston 176 and a conventional discharge valve mechanism 180 located at the discharge end of the cylinder 172. The usual equalizing vent 182 communicates the reservoir 174 with the interior of the cylinder 172 when the piston 176 is in its inoperative position.

A fitting 184 at the discharge end of the cylinder 172 is connected by a tube 186 (best shown in Fig. 1) which extends to the front end of the automobile and is there connected to a cross tube 188 which connects with the brake mechanism at each front wheel 20. Similarly another tube 190 connected to the fitting 184 extends toward the rear of the automobile where it connects with a cross tube 192 leading to the brake mechanisms at the rear wheels 22.

Figures 12, 13, 14, 15:
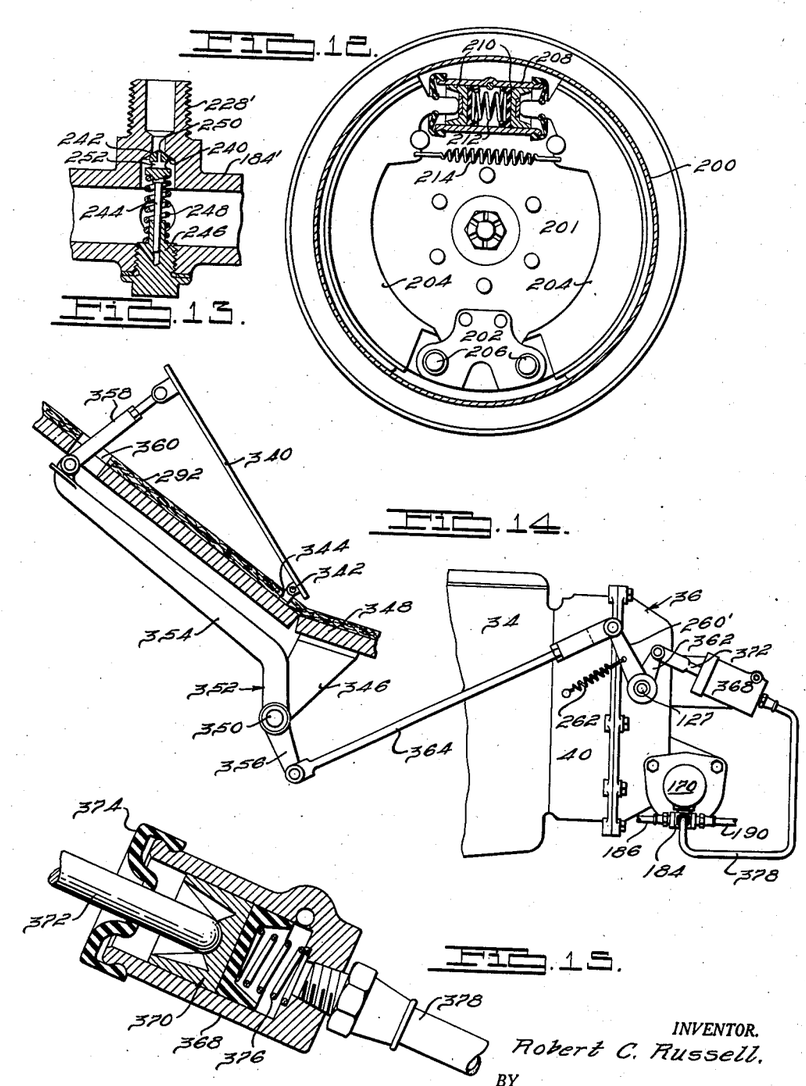
Fig. 12 is an enlarged vertical sectional view taken through one of the wheel brake mechanisms shown in Fig. 1 as on the line 12—12 thereof.
Fig. 13 is an enlarged vertical sectional view taken through the outlet fitting for the master cylinder of the hydraulic mechanism and illustrating a modified form of restricting orifice therefor.
Fig. 14 is a view similar to Fig. 9 but illustrating a mechanical connection between the control pedal and the servo mechanism.
Fig. 15 is an enlarged vertical sectional view taken axially through the pedal reaction cylinder shown in Fig. 14.

The wheel brake mechanisms may be of any suitable type and that shown in Fig. 12 is illustrative of the same and is conventional. Referring to Fig. 12, a brake drum is illustrated at 200, it being understood that the brake drum 200 is secured to its corresponding wheel concentrically therewith and adapted for equal rotation with the wheel. A backing plate 201 is fixed to the corresponding end of the corresponding axle and is provided with a bracket 202 to which two brake shoes 204 are adjacently pivoted by means of pins 206. A cylinder 208 is fixed to the backing plate 201 between the free ends of the shoes 204 and received therein is a pair of opposed piston assemblies 210 normally urged outwardly away from each other by means of a spring 212 normally maintained in compressed relation between them. The free ends of the brake shoes 204 are normally pressed inwardly against the corresponding assemblies 210 by means of a spring 214 stretched between the free end portions of the brake shoes. The spring 214 is of greater strength than the spring 212 and overcomes the same when the brakes are in inoperative position. It will be understood that the cross tubes 188 and 192 are connected into the cylinder 208 of the corresponding wheel brake mechanism between the pistons 210 therein so that when the master cylinder is actuated to force liquid between the pistons 210 under a relatively high pressure, the pistons 210 are caused to move outwardly away from each other in the cylinder 208 and to force the brake shoes 204 outwardly into contact with the braking surface of the drums 200 against the force of the spring 214, thereby exerting a braking effect on the drum 200 and corresponding wheel 20 or 22. Release of pressure on the fluid between the pistons 210 permits the spring 214 to retract the shoes 204 out of engagement with the drum 200 and force the pistons 210 inwardly toward each other, and force the liquid confined between them outwardly through the ducts 188 and 186 or 192 and 190, as the case may be, back to the master cylinder assembly 170.

Referring again to Fig. 7 it will be noted that a rod 220 is joined at one end by means of a pin 222 to the rear and lower end of the lever 162 and its opposite end is received in the bottom of a pocket 224 formed in the back face of the piston assembly 176. If desired a conventional form of dust shield 226 may be provided between the rear end of the cylinder 172 and the rod 220 to seal the rear end of the cylinder against the entrance of dust, dirt or other foreign material.

With the above construction in mind, and referring now particularly to Fig. 2 it will be understood that when the automobile or other vehicle to which the mechanism is applied is in motion the shaft 42 will be rotating, and if, during such motion, the yoke 126 is rocked in a clockwise direction of rotation as viewed in Fig. 2 the rollers 130 will be caused to press against the track 134 formed on the rear face of the disc member 102 and urge the same forwardly so as to cause the driving disc 110, which is constrained for equal rotation with the shaft 42, to be frictionally engaged between the members 100 and 102, and this frictional engagement will tend to rotate the members 100 and 102 with the disc 110. The members 100 and 102, initially at least, will respond to the rotational urge of the driven disc 100 and will cause a corresponding rotational movement of the cam member 90 therewith.

Referring now to Figs. 5 and 6 it will be noted that as the cam member 90 is thus caused to rotate one of the cam lobes 90a or 90b, depending upon the direction of rotation, will act upon the roller 148 to force the plunger 144 outwardly of the casing 40 and the plunger 144 in moving outwardly, and now referring particularly to Fig. 7, will cause the lever 162 to pivot about its pin 164 and will force the rod 220 to the left as viewed in Fig. 7, causing the piston 176 to move on its discharge stroke in the cylinder 172. This movement of the piston 176 will cause the flow of braking fluid to the various wheel brake cylinders 208 and thereby effect an application of the wheel brakes. Obviously the intensity of the braking action on the various wheels of the vehicle will depend upon the amount of force tending to urge the piston 176 toward the discharge end of its stroke and this force in turn will depend upon the amount of force tending to rotate the cam member 90. This force, in turn, depends upon the degree of frictional engagement of the driving disc 110 with the driven members 100 and 102 which frictional engagement is in turn a function of the amount of pressure exerted by the rollers 130 tending to force the member 102 toward the member 100.

It has been previously mentioned that in a servo mechanism of the general character described in which a rotating driving member is adapted for frictional engagement with the driven member to effect operation of a brake or other mechanism, if the driving member is rotating at a relatively low rate of rotation and is quickly and forcefully engaged with the driven member, the two may actually rotate equally with each other through a small degree of rotation, but during which time they will become locked to each other by the static friction of their cooperating faces, in which case an abnormal amount of resistance must be exerted against further movement of the driven member in order to cause it to slip with respect to the driving member. The necessity of offering such abnormal resistance results in the occurrence of an audible thump or knock at the time the two members are caused to be released from their equal rotation.

In accordance with the present invention means are provided for limiting the rate of rotation of the driven friction element of the servo mechanism to a rate below the lowest rate of rotation which the driving friction element will normally assume in operation. Where the invention is applied to a construction of the type shown employing a master hydraulic cylinder such as 170, it may take the simple form of a restricting orifice between the master cylinder and the wheel brake cylinders so as to limit the rate of discharge from the master cylinder and consequently the rate of rotation of the cam member 90. As best illustrated in Figs. 7 and 8 the nipple 228 on the fitting 184 which serves to connect the fitting to the master cylinder 172 is provided with a bore 230 in which is closely received a hollow plug 232 one end of which is completely closed except for an orifice 234 from therein. Orifices such as 234 on the order of thirty to fifty thousandths of an inch in diameter have been found most suitable for effecting the purpose desired on the ordinary size of pleasure cars. The particular size may, however, vary in different installations to get the required result. Thus all of the liquid which is discharged from the cylinder 172 to the various wheel brake cylinders 208 to effect actuation of the wheel brakes must flow through the orifice 234 which thereby reduces the rate of flow from the cylinder 172, and consequently the movement of the piston 176, therein to such a degree as to limit the rate of rotation of the cam member 90 to less than the lowest rate of rotation of the driving disc 110 which will normally be met with in service. Preferably the plug 232 projects upwardly into the interior of the master cylinder as shown as to reduce the liability of foreign material finding its way to the orifice 234. Although the orifice 234 restricts the normal free flow of liquid from the master cylinder sufficiently to obtain the result above stated, where properly proportioned it does not noticeably delay the speed of operation of the brakes as far as the braking effect on the vehicle is concerned.

If it is desired to eliminate possible ill-effects of the orifice 234 becoming plugged in the surface, instead of employing the construction shown in Figs. 7 and 8, a modification thereof such as is illustrated in Fig. 13 may be employed. Referring to Fig. 13, parts corresponding to the parts shown in Fig. 8 are illustrated by corresponding numerals bearing a prime mark. In this instance the passage communicating the interior of the nipple 228' with the interior of the connection 184' is formed to provide a valve seat 240. A valve 242 is provided for cooperation with the seat 240 and is adapted to open in the direction of the interior of the connection 184'. Preferably the valve 242 is provided with a stem 244 whose free end is guided in a plug 246 threaded through the opposite wall of the connection 184', and a coil spring 248 surrounding the stem 244 is maintained constantly under compression between the plug 246 and the valve 242 thus urging the valve toward seated position. The valve 242 is provided with a central passage 250 therein communicating with a cross passage 252. The passage 250 serves the same purpose as the orifice 234 in Fig. 8 and normally serves to limit the rate of flow of fluid discharged from the cylinder 172. The spring 248 is preferably of such strength that it will maintain the valve 242 in seated position and consequently the orifice 250 active for normal operations of the mechanisms, but in event the orifice 250 should become plugged, as by some foreign substance, then an abnormal pressure of fluid in the master cylinder 170 acting upon the valve 242 will force the valve 242 from its seat and thus permit application of the brakes notwithstanding the plugged condition of the orifice. In this respect it will be obvious that in order to obtain this unusually high pressure in the master cylinder to effect movement of the entire valve 242 it will be necessary for the operator of the vehicle to apply an abnormal pressure to the brake pedal, and by this means the operator will be given to understand that there is an abnormal condition in the braking system that requires correction without, however, rendering the brakes inoperative. Should the passage 250 become plugged so as to cause the valve 242 to lift upon application of the brakes, due to the fact that the plugging will occur on the master cylinder side of the passage 250, the foreign material causing the plugging will usually be forced out of plugging position when the pressure thereon is reversed upon release of the brakes. Even if it does not become dislodged in this manner it will insure against operation of the vehicle without effective brakes, and thus serve as a safety factor.

Figures 9, 10, 11, 18:
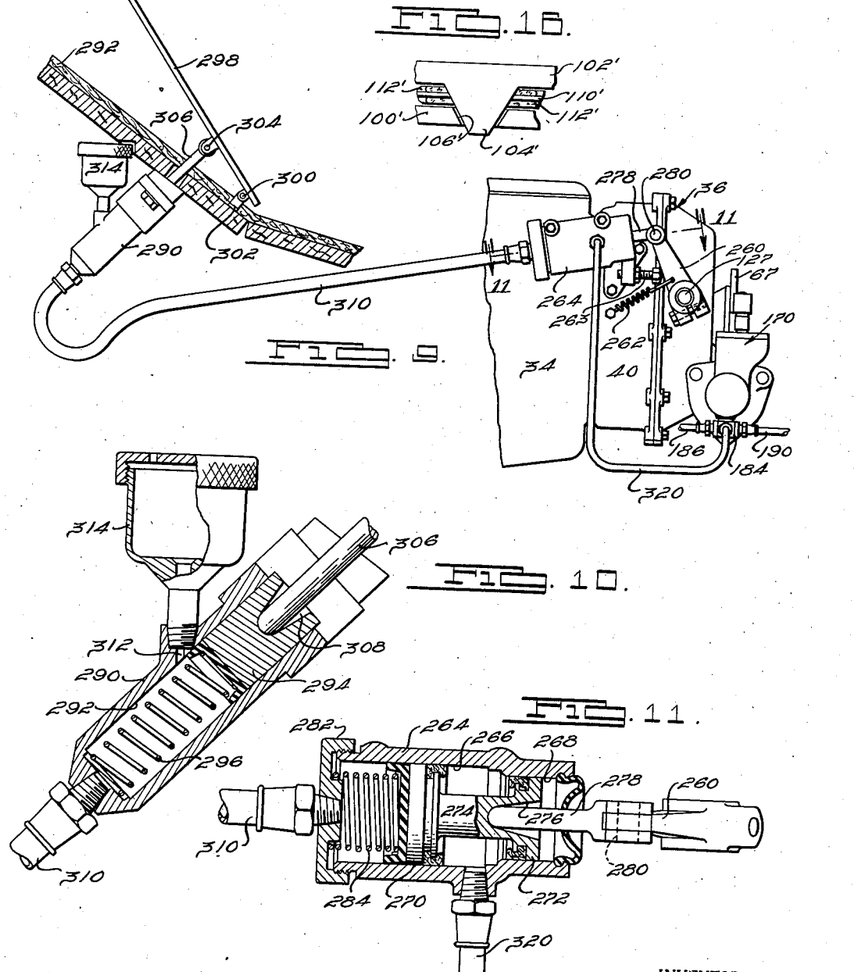
Fig. 9 is a fragmentary, partially broken, partially sectioned side elevational view of the servo mechanism shown in Fig. 1, and illustrates the connection between the control pedal and the servo mechanism.
Fig. 10 is an enlarged partially broken, vertical sectional view taken centrally through the cylinder shown in Fig. 9 to which the operating pedal is connected.
Fig. 11 is an enlarged sectional view taken axially through the control cylinders shown mounted on the servo mechanism in Fig. 9 as on the line 11—11 of Fig. 9.

A preferred type of mechanism for controlling the operation of the servo mechanism is illustrated in Figs. 9, 10 and 11. Referring particularly to Figs. 7 and 9 it will be noted that the left hand shaft extension 127 of the yoke 126, as viewed in Fig. 7, projects through the casing 40 and on its outwardly projecting end has fixed thereto a lever 260. The lever 260 is constantly urged in a counterclockwise direction of rotation, as viewed in Fig. 9, by means of a coil spring 262 tensioned between it and a suitable point on the housing 40. A suitably adjustable stop member, shown in the form of a screw 263 threaded into a lug formed on the exterior of the housing 40, is adapted to abut and limit forward movement of the lever 260 under the force of the spring 262, and consequently controls the spacing of the rollers 130 from the track 134 during inoperative periods of the mechanism. Suitably secured to the housings 34 and 40 in approximate alignment with but forwardly of the upper end of the lever 260 is a cylinder 264, best shown in Fig. 11. It will be noted that the cylinder 264 is provided with two concentric and communicating bores 266 and 268 respectively, the former being the larger in diameter. A piston assembly indicated generally at 270 is reciprocably received within the bore 266 and a piston assembly 272 is reciprocably received in the bore 268, the piston assemblies 270 and 272 being rigidly intercommunicated for equal reciprocatory movement by means of an inter-communicating post 274. The piston 272 is provided with a pocket 276 in the rear face thereof in which the forward end of the rod or plunger 278 is received in a manner to permit a limited amount of universal movement of the 278 with respect to the piston 272. The rear end of the rod 278 is pivotally connected by means of a pin 280 with the upper end of the lever 260. A cap 282 closes the forward end of the cylinder 264 and a coil spring 284 is constantly maintained under compression between the forward face of the piston 270 and the inner face of the cap 282, it being understood that the force of the spring 284 is less than the force of the spring 262 so that the spring 262 may overcome the spring 284 in moving the yoke 126 to inoperative position when the control pedal hereinafter referred to is released.

Referring to Fig. 9 it will be noted that a cylinder 290 is suitably secured to the lower surface of the usual toe board 292 of the vehicle of which it forms a part and is preferably arranged in approximately perpendicular relation with respect to the plane of the toe board as illustrated in Fig. 9. As best shown in Fig. 10 the cylinder 290 is provided with a bore 292 in which a piston 294 is reciprocably received. A coil spring 296 is constantly maintained under compression between the piston 294 and the lower end of the cylinder as illustrated so as to constantly urge the piston 294 toward inoperative position. Although any suitable type of foot pedal mechanism may be employed for actuating the cylinder 294 against the force of the spring 296, in view of the fact that the amount of pressure required to actuate the piston 294 is relatively small, a type of pedal that is commonly employed in connection with accelerators for automobiles may be found useful for this purpose. Accordingly such a pedal 298 is shown in Fig. 9 as being pivoted by means of a pin 300 to a bracket 302 fixed to the toe board 292. Intermediate its ends the pedal 298 is pivotally connected by means of a pin 304 with a rod 306, the opposite end of which is received in a pocket 308 formed in the outer end of the piston 294 as shown in Fig. 10. Depression of the upper end of the pedal 298 will thus cause the pedal to pivot about the pin 300 and to press the rod 306 which will thereupon cause a corresponding depressing movement of the piston 294 in the cylinder 290.

The discharge end of the cylinder 290 is communicated by means of a tube 310 with the interior of the cylinder 264 through the cap 282 thereof. Consequently if the space within the cylinder 290 below the piston 294, the tube 310 and the space within the cylinder 264 to the left of the piston 270, as viewed in Fig. 11, is filled with a liquid, any downward movement of the piston 294 as caused by the pedal 298 will displace a corresponding volume of the liquid from the cylinder 290 into the tube 310 and displace an equivalent volume from the tube 310 into the forward end of the cylinder 264 and will cause both pistons 270 and 272 to be moved rearwardly, or to the right as viewed in Fig. 11, within the cylinder 264. This rearward movement of the pistons 270 and 272 will act through the rod 278 to rotate the lever 260 in a clockwise direction of rotation as viewed in Fig. 9, and will rock the yoke 126 in a direction to cause operation of the servo mechanism as previously described.

In order to automatically compensate for variations in volume of liquid in the liquid connection between the pistons 294 and 270, the cylinder 290 is preferably provided with a passage 312 through the wall thereof which is normally uncovered by the piston 294 when at the extremity of its stroke in an inoperative direction. A reservoir 314 is threaded into the cylinder 290 in communication with the passage 312 so that its contents are in free communication with the liquid within the bore 292 of the cylinder 290 whenever the piston 294 is at the outer end of its stroke. Thus any loss of liquid in the fluid connection between the control pedal and the servo mechanism may be compensated for automatically, as well as any excess that might occur in the fluid connection because of a rise in temperature of its contents or for other reasons.

The advantages of the construction just described include substantial elimination of all friction in the connection between the control pedal and servo mechanism, thus aiding in obtaining more perfect modulation of the braking system, and ease of connecting the control pedal to the servo mechanism regardless of the relative positions or distances between these parts and/or intervening obstructions to straight line connections. Particularly where the construction is employed for remote control, as in rear engined vehicles, the advantages will be found most useful.

As best illustrated in Fig. 11, the pistons 270 and 272 are spaced from one another by the post 274 a material distance and this space is connected by means of a tube 320 with the outlet connection 184 for the master cylinder assembly 170, and because of this connection it will be obvious that any pressure on the liquid in the hydraulic braking system simultaneously acting against the pistons 210 of the individual wheel brakes thereof, is also transmitted to the opposed faces of the pistons 270 and 272. Because of the fact that the piston 270 is of greater cross sectional area than the piston 272 such pressure will create a pressure differential on the piston assembly comprising the interconnected pistons 270 and 272 tending to move the piston 270 forwardly. Inasmuch as such pressure of the hydraulic braking system will only be apparent when the pedal 298 has been depressed to actuate the servo mechanism it will be apparent that this pressure of the hydraulic braking system acting on the piston assembly 270—272 will act in opposition to the pressure created within the cylinders 290 and 264 tending to actuate the servo mechanism, and it will oppose the pressure applied to the pedal 298 in direct proportion to the pressure supplied thereto and, consequently, the pressure simultaneously existing in the wheel brake system. By this means the operator of the pedal 298 is advised by the amount of pressure applied directly to the pedal 298 as to the degree of braking force actually being applied to the wheel brakes.

While the tube 320 may be connected into the hydraulic braking system at a point between the orifice 234 and either in the wheel brakes or the master cylinder in accordance with the broader aspects of the invention, the former is preferred as in such case it is the liquid pressure actually exerted against the pistons 210 of the wheel brake mechanisms that is simultaneously exerted on the pistons 270 and 272. For this reason a false feel of the braking force being applied when first initiated, such as would occur if the tube 320 was connected into the hydraulic braking system between the master cylinder and orifice 234, is eliminated and the operator is always advised of the true braking force through reaction of the fluid pressure in the hydraulic braking system against actuating movements of the control pedal.

It is not necessary to employ a hydraulic connection between the control pedal and the servo mechanism as illustrated in Figs. 9, 10 and 11 to obtain the feel of the brakes as above described. The same effect may be obtained where a mechanical linkage connects the control pedal with the servo mechanism, and one form of such mechanism is illustrated in Figs. 14 and 15. Referring to these figures it will be noted that a control pedal 340, similar to the pedal 298 previously described, is similarly mounted on the toe board 292 by means of a pivot pin 342 and bracket 344. A bracket 346 is secured to the underside of the floor board 348 immediately to the rear of the toe board 292, and pivotally mounted thereon by means of a pin 350 is a double armed lever indicated generally at 352 and having a forwardly extending arm 354 and a downwardly extending arm 356. A longitudinally adjustable link 358 extending through an opening 360 in the toe board 292 connects the free end of the control pedal 340 with the free end of the arm 354.

On the servo mechanism the arm or lever 260 is replaced with a similar lever arm 260' but having, in addition to the upwardly extending arm, an upwardly extending arm 362 disposed at an angle to the lever arm 260'. The upwardly extending arm 260' is connected by a longitudinally adjustable rod or link 364 with a free end of the arm 356 of the lever 352. Thus with this construction when the forward end of the pedal 340 is depressed by the operator the lever 352 is caused to rotate in a counterclockwise direction of rotation as viewed in Fig. 14, causing the lower end of the arm 356 to move rearwardly and to act through the links 364 to rotate the lever 260' in a clockwise direction which, as previously described, will cause a clockwise rotation of the shaft ends 127 of the yoke 126 and cause application of the servo mechanism.

In order to get the feel of the brakes as described in connection with the construction illustrated in Figs. 14 and 15, a cylinder 368 is suitably mounted on the housing 40 of the servo mechanism. This cylinder 368 is shown in detail in Fig. 15 where it will be noted that a piston assembly 370 is slidably mounted within it. A link 372 pivotally connected at its forward end to the upper end of the arm 362 seats at its rear end in the forward face of the piston assembly 370 in such a manner as to permit universal movement thereof with respect thereto. A suitable type of dust guard 374 preferably seals the space between the link 372 and the forward end of the cylinder 368 against the entrance of dust, dirt or other foreign material. Preferably a coil spring 376 is provided between the rear wall of the cylinder 368 and the rear face of the piston assembly 370 and maintained under compression between them, it being understood, however, that the force of this spring is less than the force of the spring 262 so that the latter overcomes the former. The rear end of the cylinder 368 is connected by a tube 378 with the connection 184 at the discharge end of the master cylinder assembly 170.

With this construction it will be apparent that when the pedal 340 is depressed to cause actuation of the servo mechanism and consequently application of the various wheel brakes, the corresponding pressure set up in the hydraulic braking system between the servo mechanism and the wheel brakes is transmitted through the tube 378 to the cylinder 368 and acts against the rear face of the piston assembly 370 and through the link 372 and arm 362 of the lever 260' to oppose the actuating force on the pedal 340.

The feel of the brakes by employing the pressure in the hydraulic braking system to oppose brake actuating movement of the control pedal as above described may be similarly obtained mechanically in the manner disclosed in the modification illustrated in Fig. 16. In such case the construction shown in Figs. 1 to 11, inclusive, is modified by substituting the construction shown in Fig. 16 for the construction shown in Fig. 3, and employing the type of connection shown in Fig. 14 between the foot pedal and the servo unit, but eliminating the reacting cylinder 368 and the connection in which it is located between the master cylinder and the lever 260'. It will be noted that Fig. 16 is similar to Fig. 3 and that equivalent parts are indicated by the same numerals except that such parts bear a prime mark. It will also be noted that the only difference between the construction illustrated in Fig. 3 and the construction illustrated in Fig. 16 is in the shape of the lugs and coacting recesses or notches in the members 102' and 100' respectively. In the construction illustrated in Fig. 3 the side faces of the lugs 104 are approximately perpendicular with respect to the plane of the member 102 and the side walls of the grooves or notches 106 in the member 100 which receives the lugs 104 are complementarily disposed. Obviously in the construction illustrated in Fig. 3 torque transmitted between the members 100 and 102 through the medium of the lugs 104 will have no appreciable effect in tending to separate the members 100 and 102. In Fig. 16, however, the circumferentially facing sides of the lugs 104' are disposed at a material angle with respect to each other and to a plane passing through the center thereof and including the axis of the drive shaft 42, and the grooves or notches 106' in the member 100' adapted to receive the lugs 104' are correspondingly shaped. Where this modification is incorporated in the servo mechanism shown in previous views and the hydraulic reaction means for the control pedal previously described is dispensed with, it will be understood that as the control pedal is operated to oscillate the yoke 126 to press the member 102' forwardly so as to cause the driving member 110' to be frictionally gripped between it and the member 100', the resistance offered to rotation of the cam member 90 and consequent application of the braking system will set up a torque differential between the members 100' and 102' acting through the lugs 104', the member 102' attempting to turn with the driving disc 110' and the member 100' being restrained against such rotation through the resistance set up by the application of the brakes. This difference in torque acting through the angular faces of the lugs 104' and the notches 106' will tend to force the member 102' rearwardly, or to the right as viewed in Fig. 2, away from the member 100' and this tendency will be transmitted through the yoke 126 back to the control pedal for the servo mechanism as a reaction opposing movement of the control pedal in an operating direction. It will, of course, be necessary that the lugs 104 be tapered on both circumferentially directed faces if the desired feel of the brakes is to be obtained when the vehicle is moving either forwardly or rearwardly, and the angularity of such faces with respect to a plane passing through the center of the lug 104' and including the axis of the shaft 42 should be no less than 30°, or an included angle between both faces 60°, and preferably greater, if any material feel of the brakes is to be obtained by the use of this construction.

It will be understood from the foregoing that in view of the fact that the cam 90 and members 100 and 102 rotatable therewith are mounted on rolling anti-friction means, that the engagement between the yoke 126 and the member 102 is through rolling contact means, and that the connection between the servo mechanism and the wheel brakes is by means of a hydraulic system, there is a minimum of frictional resistance to the free movement of the various parts of the servo mechanism and to the transmission of pressure from the servo mechanism to the wheel brakes. As a result of this construction any slight variation in the frictional engagement of the members 100 and 102 of the servo mechanism with the driving member 110 thereof will be immediately effective at the wheel brakes. Accordingly, the slightest amount of variation in pressure by the operator on the control pedal 298 or 340, as the case may be, will be immediately effective to cause a corresponding variation in the pressure acting on the wheel brakes. For this reason it is possible to obtain almost perfect modulation of the braking forces acting on the wheels of the vehicle and this regardless of whether the braking force is being increased or decreased. In this respect it makes little difference whether the hydraulic type of connection between the control pedal and the servo brake illustrated in Figs. 9, 10 and 11, or the mechanical type illustrated in Figs. 14 and 15 is employed and this primarily for the reason that the re-active force applied to these pedals in order to obtain a feel of the brakes, as above described, is sufficient to overcome an appreciable amount of frictional resistance in the connection between the pedal and the servo mechanism.

It will also be understood that any desired degree of multiplication of the actuating force applied to the control pedal may be obtained by the servo mechanism by varying the lift of the cam lobes 90a and 90b, that the action of the mechanism is equally effective regardless of whether the vehicle is moving forwardly or rearwardly.

Because of the restricting orifice employed at the discharge end of the master cylinder it is impossible to provoke a condition, even under conditions of extremely low speeds, in which the driving and driven elements of the servo mechanism may be caused to rotate bodily in unison and thus the undesirable effects of such equal rotation is eliminated. Further by the employment of a cylinder subject to the pressure simultaneously existing in the hydraulic braking system to oppose actuating movement of the control pedal the operator of the vehicle is at all times accurately informed as to the actual degree of pressure being applied to the wheel brakes regardless of the fact that the servo mechanism is interposed between the control pedal and the wheel brakes, and that a similar effect may be obtained by the mechanical construction illustrated in Fig. 16.

It is to be understood that, for the most part, the specific construction herein described and shown is primarily illustrative of the broad principles of the invention which may assume various forms of design in accordance with the desires of the individual designer once the broad principles of the invention is made known to him, and accordingly it will be understood that formal changes may be made in the specific embodiments of the invention described without departing from the spirit or substance of the broad invention, the scope of which is commensurate with the appended claims.

What I claim is:

1. The combination with a braking system for a motor vehicle having wheel brakes, a servo mechanism for operating said wheel brakes, said servo mechanism including a rotatable driving member and a rotatable but normally stationary driven member, a hydraulic transmission system connecting said servo mechanism with said wheel brakes including a master cylinder operated by said driven member and a fluid connection between said master cylinder and said wheel brake, and means for effecting frictional engagement of said driving and driven members, of means for maintaining rotational movements of said driven member to a lesser angular speed than said driving member comprising a restriction in said hydraulic transmission system.

2. The combination in a braking system for a motor vehicle, a servo mechanism including frictionally engageable driving and driven members, wheel brakes to be actuated thereby, and a fluid connection between said servo mechanism and said wheel brakes, of a member provided with an orifice in said connection so constructed and arranged as to constantly limit the rate of flow of fluid through said connection to a rate preventing equal rotational movement of said driven and driving members under normal low speed operating conditions of said vehicle.

3. The combination with a braking system for motor vehicles having a servo mechanism, wheel brake mechanism, and a fluid connection between said servo mechanism and said wheel brake mechanism, of a restriction in said connection, and means for by-passing fluid around said restriction upon plugging of said restriction.

4. The combination with a braking system for motor vehicles having a servo mechanism, a wheel brake mechanism, and a fluid connection between said servo mechanism and said wheel brake mechanism, of a seat in said connection, a member seated against said seat, spring means constantly urging said member towards seated position, said member having an orifice therein serving to restrict the rate of flow of fluid through said connection and being movable away from said seat under predetermined pressure differential acting on opposite sides thereof to permit flow of fluid through said connection independently of said orifice.

5. In a braking system for a motor vehicle, in combination, wheel brakes, a mechanical servo mechanism including frictionally engageable driving and driven members, a control pedal, a hydraulic connection between said servo mechanism and said wheel brakes, a hydraulic connection between said control pedal and said servo mechanism whereby movement of said pedal may effect frictional engagement of said members, and means operable to increase the fluid pressure in the last mentioned fluid connection upon and by reason of increase in fluid pressure in the first mentioned fluid connection.

6. In a braking system for a motor vehicle, in combination, wheel brakes, a mechanical servo mechanism including frictionally engageable driving and driven members, a control pedal, a fluid connection between said servo mechanism and said wheel brakes, a fluid connection between said control pedal and said servo mechanism whereby movement of said pedal may effect frictional engagement of said members, a movable piston in the last mentioned connection, and means for applying the fluid pressure simultaneously existing in the first mentioned connection against said piston in opposition to the movement thereof by said control pedal.

7. In a braking system for a motor vehicle, in combination, wheel brakes, a servo mechanism, a control member, a fluid connection between said servo mechanism and said wheel brakes, a fluid connection between said control member and said servo mechanism, said last mentioned connection including a differential piston, and means for communicating the pressure simultaneously existing in the first mentioned connection to the opposed faces of said differential piston.

8. In a braking system for a motor vehicle, in combination, wheel brakes, a servo mechanism, a control member, a fluid connection between said servo mechanism and said wheel brakes, a fluid connection between said control member and said servo mechanism, said last mentioned connection including a differential piston, and means for communicating the pressure simultaneously existing in the first mentioned connection to the opposed faces of said differential piston, the last mentioned connection being so constructed and arranged that the pressure applied to the fluid therein by actuating movement of said control member is applied against a face of the larger of said differential pistons.

9. In a braking system for a motor vehicle, in combination, wheel brakes, a servo mechanism, a control member for said servo mechanism, a fluid connection between said servo mechanism and said wheel brakes, means operatively connecting said control member and said servo mechanism, means in said fluid connection restricting the rate of flow of fluid therethrough, and means for opposing operating movement of said control member in proportion to the fluid pressure simultaneously existing in said fluid connection between said restriction and said wheel brakes.

10. In a braking system for a motor vehicle, in combination, wheel brakes, a servo mechanism, a control member, a fluid connection between said servo mechanism and said wheel brakes, a connection between said control member and said servo mechanism, a piston operatively connected with said control member for corresponding movement therewith, a restriction in said fluid connection for retarding the rate of flow of fluid therethrough, and a connection between piston and said fluid connection connected into said fluid connection at a point between said restriction and said wheel brakes whereby the pressure developed in said fluid connection may act on said piston in opposition to the force exerted on said piston by said control member.

11. In a servo mechanism, in combination, a housing, a rotatable driving member in said housing, a rotatable but normally stationary driven member in said housing, means for effecting frictional engagement between said driving and driven members, a cam element in said housing rotatable with said driven member, an inwardly projecting boss on the inner wall of said housing, a plunger axially slidably received in said boss, said plunger cooperating with said cam member whereby to receive axial movement therefrom, said boss having a slot therethrough and said cam member adapted to project in part into said slot when at one extreme of its movable position, and a stop on said cam member engageable with said boss to limit rotational movement of said cam member when at the extremity of its movement in one direction of rotation.

12. In a servo mechanism, in combination, a housing, driving and driven members in said housing, means for effecting frictional engagement between said driving and driven members, a boss projecting outwardly from an outer wall of said housing, a plunger axially slidably received in said boss, a cam member within said housing rotatable with said driven member and cooperating with said plunger to cause axial movement thereof, a lever on the exterior of said housing having an end co-operating with the outer end of said plunger, and said boss having a slot extending into the bore thereof whereby to provide clearance for movement of said lever into and out of intersecting relation with respect to said boss.

13. In a servo mechanism, in combination, a housing, a rotatable driving member in said housing, a rotatable but normally stationary driven member in said housing, means for effecting frictional engagement between said driving and driven members, a cam member in said housing rotatable with said driven member, a plunger projecting through a wall of said housing and cooperating with said cam member whereby to receive movement therefrom, an anti-friction roller mounted on the inner end of said plunger and directly engaging said cam member, the outer end of said plunger being slotted, a power output lever on the exterior of said housing, and the end of said lever being received within the slotted end of said plunger whereby to receive movement therefrom and to maintain said plunger in a predetermined position of rotation.

14. In a servo mechanism, in combination, an axially shiftable driving member, means for driving said driving member, a normally stationary but rotatable driven member, a device adapted to be operated by rotational movement of said driven member, means including an axially shiftable member for effecting an axial clamping of said driving member between it and said driven member whereby to urge said driven member toward rotational movement, and means in the connection between said driven member and said device operating to materially delay the rate of movement of the driven member during normal operation.

ROBERT C. RUSSELL.